(12) United States Patent
Steeb et al.

(10) Patent No.: US 7,693,936 B2
(45) Date of Patent: Apr. 6, 2010

(54) MESSAGING SCHEMA FOR SERVICES INTERACTION ON PREPAID AND SUBSCRIPTION SYSTEM

(75) Inventors: Curt A. Steeb, Redmond, WA (US); Minghui Gao, Redmond, WA (US); Munisamy Prabu, Issaquah, WA (US); Zeyong Xu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1133 days.

(21) Appl. No.: 11/321,676

(22) Filed: Dec. 29, 2005

(65) Prior Publication Data
US 2007/0153681 A1    Jul. 5, 2007

(51) Int. Cl.
*G06F 15/16* (2006.01)
(52) U.S. Cl. ........................ 709/203; 709/230
(58) Field of Classification Search .............. 709/203, 709/230
See application file for complete search history.

(56) References Cited

U.S. PATENT DOCUMENTS

| | | | | |
|---|---|---|---|---|
| 5,138,611 | A | * | 8/1992 | Carn et al. ............... 710/316 |
| 5,457,735 | A | * | 10/1995 | Erickson ................ 455/450 |
| 5,949,977 | A | * | 9/1999 | Hernandez ............. 709/229 |
| 6,286,028 | B1 | * | 9/2001 | Cohen et al. ........... 709/202 |
| 2002/0065759 | A1 | * | 5/2002 | Boies et al. ............ 705/37 |
| 2005/0004974 | A1 | * | 1/2005 | Sharma et al. ......... 709/202 |
| 2007/0118648 | A1 | * | 5/2007 | Millefiorini et al. ..... 709/225 |

* cited by examiner

*Primary Examiner*—Patrice Winder
*Assistant Examiner*—Minh-Chau Nguyen
(74) *Attorney, Agent, or Firm*—Marshall, Gerstein & Borun LLP (57) ABSTRACT

Inter-service messages conform to a protocol message schema and support predetermined types according to the destination service. Because the schema and types are well defined, input queues corresponding to the services are able to quickly identify and remove non-conforming messages. The schema supports both prepaid and subscription business models and is extensible to other types.

13 Claims, 4 Drawing Sheets

MESSAGING SCHEMA FOR SERVICES INTERACTION ON PREPAID AND SUBSCRIPTION SYSTEM

BACKGROUND

Systems with multiple interactive services, especially those that expect high volumes of inbound traffic, may use inbound message queues to listen for the inbound traffic. Because the queues are open-ended, any authorized service, application or user can place messages in the queue. However, not all messages are serviceable. Some messages may be malformed, that is, do not conform to the message schema for that queue. Other messages may be correct in form, but end up in the wrong queue. Both these issues can interrupt the queue process and slow genuine messages from being processed.

SUMMARY

A message schema may be defined for each of the services used in a system and the type of the payload for that message may also be defined. When the service listens to its inbound queue it may validate an inbound message first by examining the schema and then checking the payload type against expected payload types. If the validation fails at either point, the message may be removed and an appropriate event raised concerning the rejected message. A specific schema and type depicted may be used in both a prepaid and subscription services environment because the message schema abstracts the payload such that either subscription and prepaid business models may be supported.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
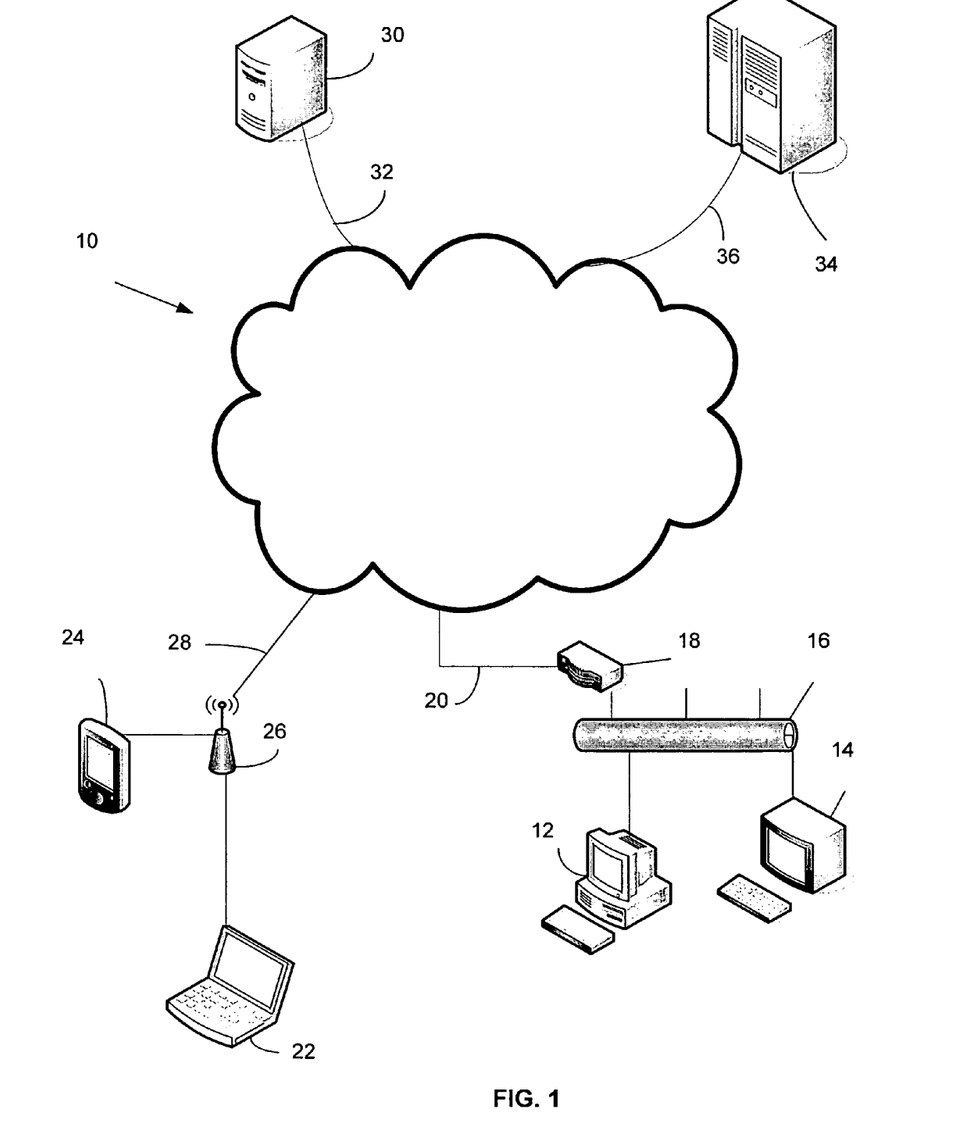
FIG. 1 is a simplified and representative block diagram of a computer network.
Figure 2:
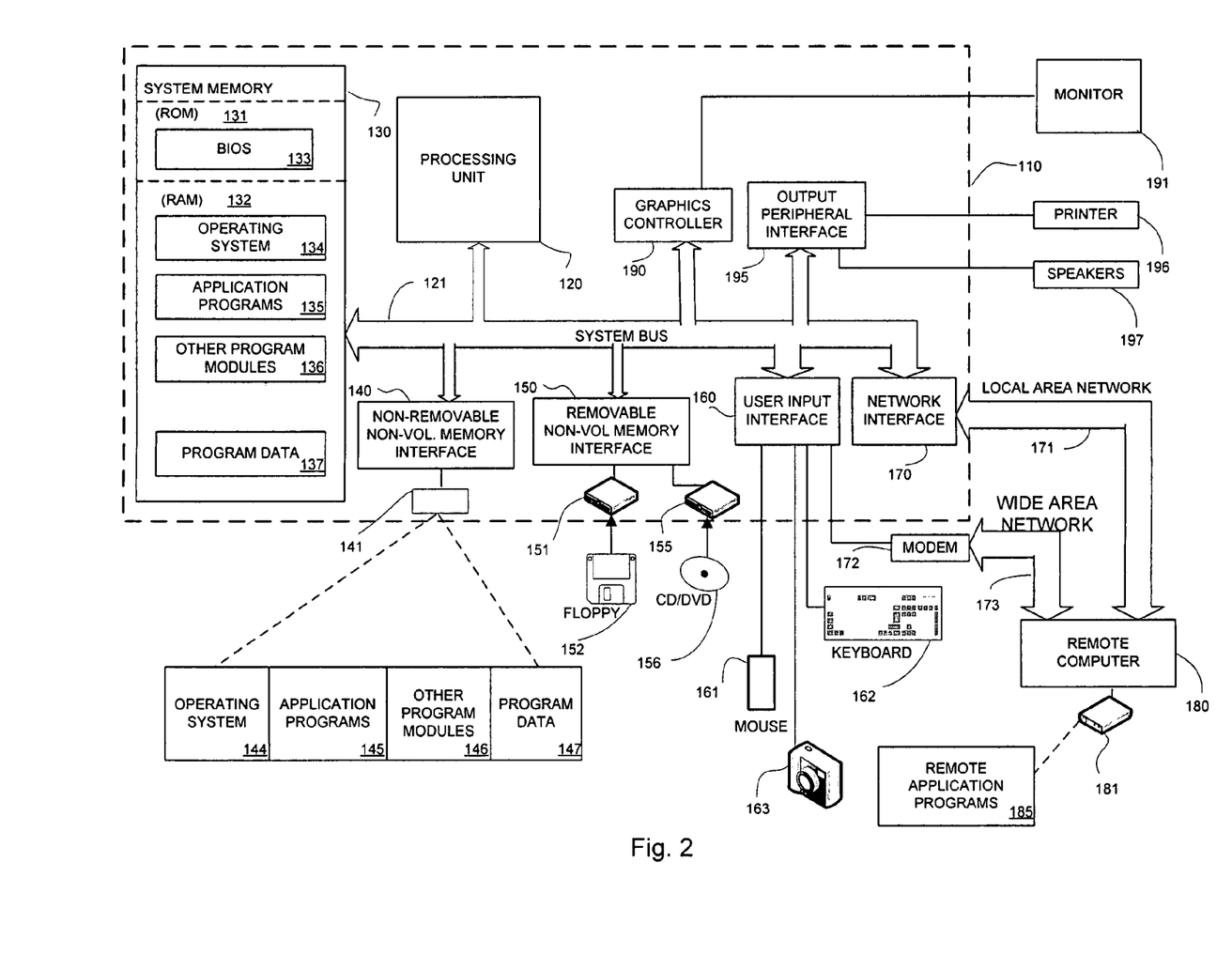
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, START HERE communication devices, databases, processes, peer-to-peer network endpoints, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
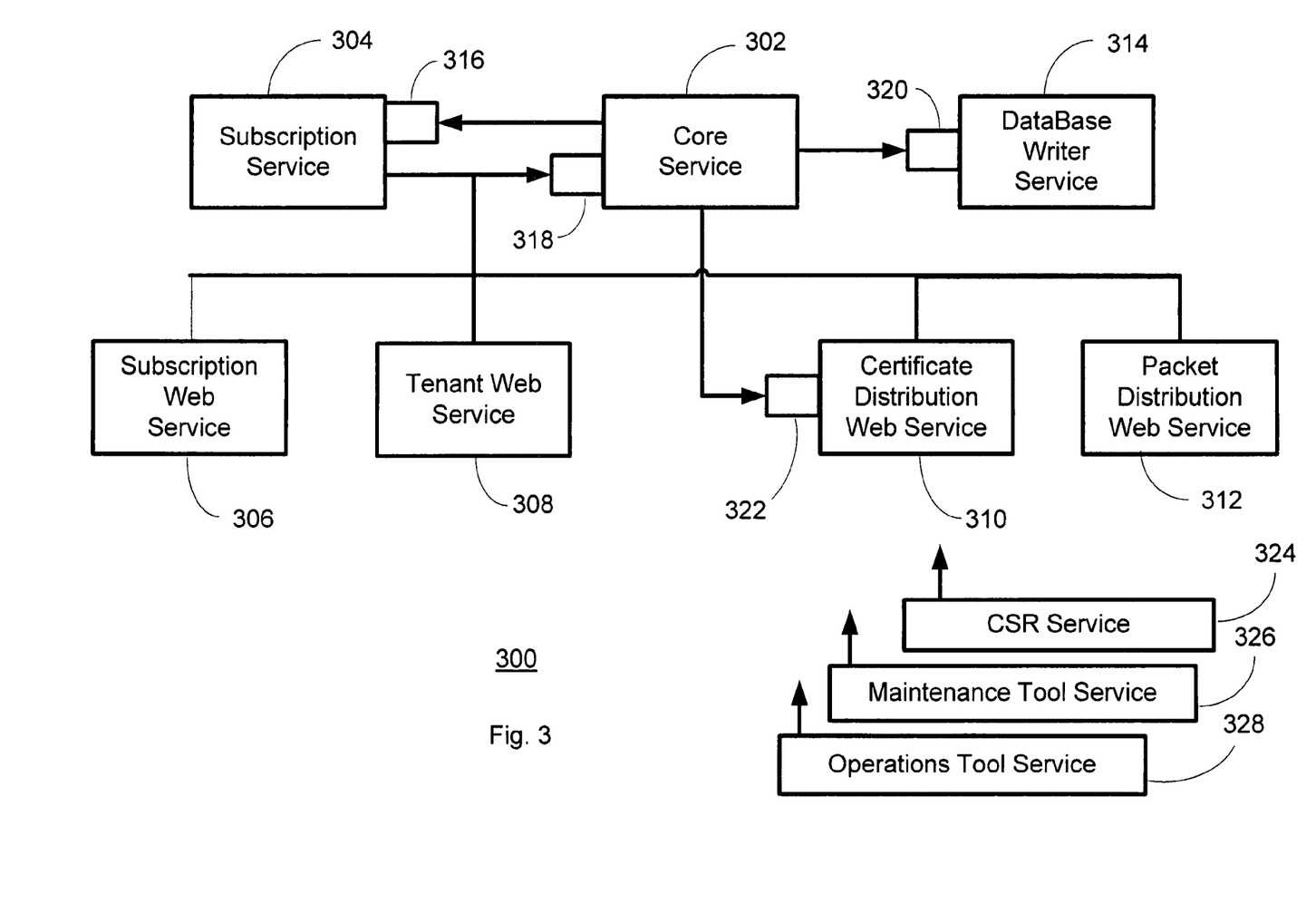
FIG. 3 is a simplified and representative block diagram of a provisioning system for prepaid and subscription-based computers.

FIG. 3 is block diagram of an architecture 300 supporting prepaid and subscription services for prepaid and subscription-based business model support. The core service 302 may receive messages on the core service input queue 318 from the subscription service 304, the subscription web service 306, the tenant web service 308, the certificate distribution web service 310, and the packet distribution web service 312. The subscription service 304 may receive messages from the core service 302 on the subscription service input queue 316. The certificate distribution web service 310 may receive messages on the certificate distribution web service queue 322. The database writer (DBWriter) service 314 may receive messages from the core service 302 on the database writer input queue 320. The subscription service 304 and subscription web service 306 are associated with subscription services and may not be required in prepaid-only systems. Likewise, the tenant web service 308 is associated with prepaid services and may not be required in subscription-only systems. Both prepaid and subscription services may co-exist in this architecture 300. Additional messages may be delivered to the various queues from a customer service representative service 324, a maintenance tool or resource monitor service 326, or an operations tool service 328. These messages may include requests for the availability of services, requests to resend packets, or requests to reset a sequence number. The types, sources and destinations of defined messages and their types are summarized in Table 1.

Figure 4:
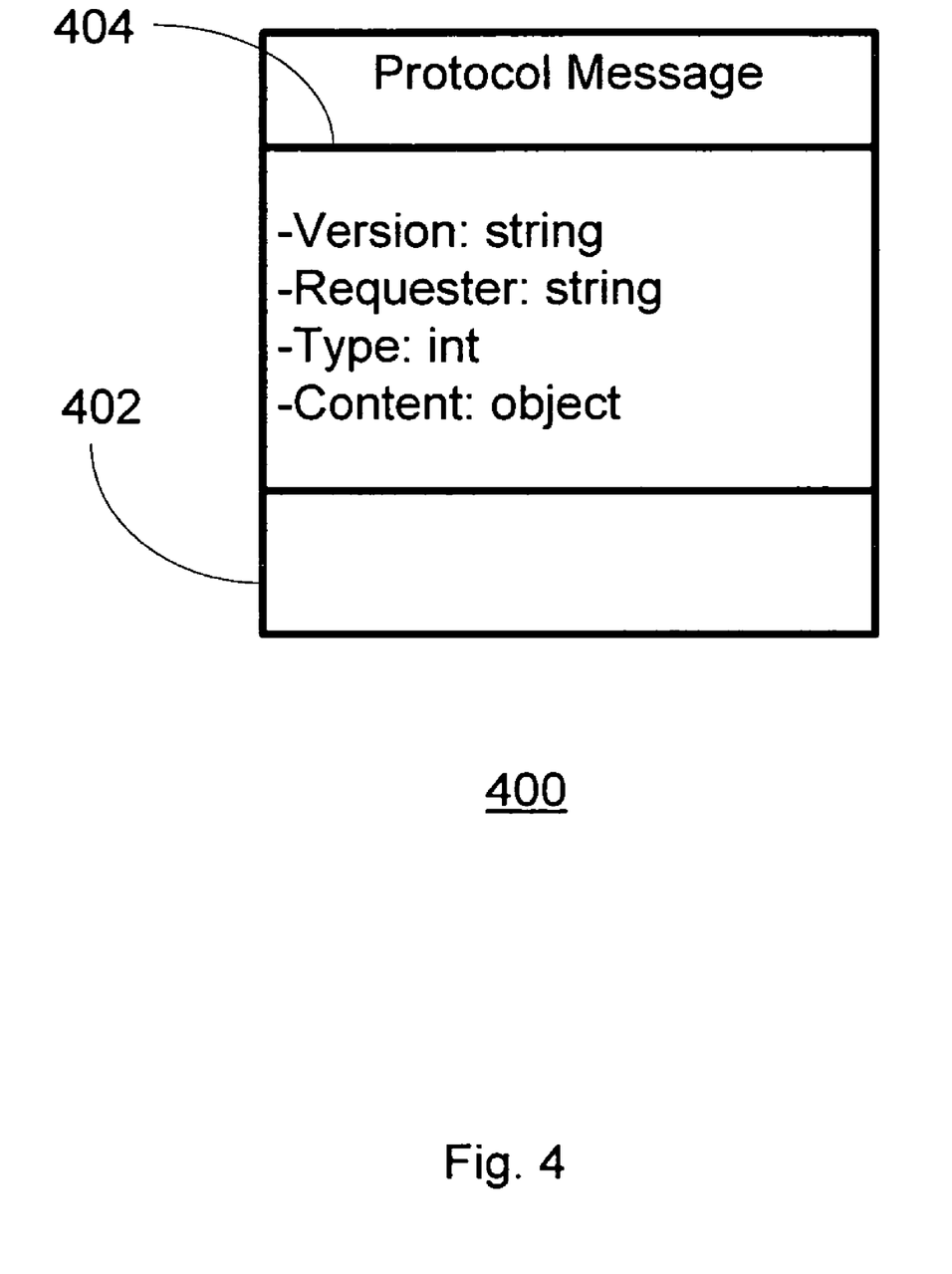
FIG. 4 is a representative protocol message schema.

FIG. 4 is a protocol message schema 402 for use with the messages of Table 1. The common section 404 includes version, requester, and type information. The version attribute identifies the schema version and the requester attribute identifies the requesting party, often in the form of a combination of hardware identifier and a product, or offer, identifier. The content object is the message payload and reflects the type enumeration. As mentioned above, the schema abstracts the message contents from the consistency checks performed on the schema and the message type. Therefore, each input queue can quickly qualify an incoming message by checking the schema and the matching type. If either the schema or type do not match schemas supported for that queue, or if the type of the content object does not match a type specified for that schema, the message may be removed from the queue and an event raised.

TABLE 1

| Type | Sender | Receiver | Purpose |
| --- | --- | --- | --- |
| RegisterDevice | Subscription Service, Prepaid Tool | Core Service Queue | Registers device name, init key for certificate bootstrapping purposes. |
| CreatePrepaidPacket | Tenant Web Service | Core Service Queue | Sends request to create Prepaid provisioning packet after redeeming the scratch card token. |
| PacketPublish | Core Service | DBWriter Service Queue | Publishes the provisioning packet generated to Distribution database. |
| BootstrapPublish | Core Service | DBWriter Serivce Queue | Publishes the certificate bootstrap information to Distribution database. |
| CertRequest | Certificate Distribution Web Service | Core Service Queue | Sends request to Core service to get the certificate issued from Certificate Authority. |
| CertResponse | Core Service | Cert Dist Web service Queue | Sends back the issued certificate from CA to Cert Dist Web Service. |
| PacketDownload | Packet Distribtuion Web Service | Core Service Queue | Sends the packet download information to Core service. |
| PacketDownloadAck | Packet Distribtuion Web Service | Core Service Queue | Sends the packet download acknowledgement information to Core service. |
| SubscribeDevice | Subscription Service | Core Service Queue | Sends the information to turn on or off the subscription. |
| ConfigureDevice | Subscription Service | Core Service Queue | Sends device specific configuration details like Grace period and Enforcement level. |
| ConfigureDefault | Subscription Service | Core Service Queue | Sends the request to configure with default setting. |
| CreateSubscriptionPacket | Subscription Service | Core Service Queue | Sends the information to create one time subscription packet. |
| BatchIn | Subscription Service | Core Service Queue | Sends the batch of operations to carry out. |
| BatchOut | Core Service | Subscription Service Queue | Sends the results of batch operation executed back to the requester. |
| ScheduleSubscriptionPacket | Subscription Service | Core Service Queue | Sends the scheduling info to create subscription packet. |
| ResetLSN | CSR Tool | Core Service Queue | Sends the data to reset LSN for a specific device with HWID |
| RecreatePacket | CSR Tool | Core Service Queue | Sends the data to recreate packet with JobId. |
| ServiceHealth | ResourceMonitor | Core, DBWriter, Subscription Service Queue | Sends the service health polling request to provide availability of services. |
| TestConnection | Operations Tool | All Service Queue | Requests the connectivity and self diagnosis information from services. |
| QueryBatchOut | Subscription Service | Core Service Queue | Sends the query request to get the batch response with the BatchID. |
| StartPendingJob | Core Service | Core Service Queue | Initiates the pending job. |

The message XML schema and their corresponding type definitions for the messages listed in Table 1 follow.

By defining a schema and message types independent of underlying function, the above allow for fast and reliable handling of messages between services, while providing an extensible mechanism supporting both prepaid and subscription business models.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computer-readable storage medium storing computer executable instructions for implementing a method of receiving data on an input queue and confirming a schema and content object, the method comprising:

receiving a message at a first queue associated with a service;

verifying a protocol message schema of the message includes a version, a requester, a type enumeration, and a content object;

verifying the content object to include a predetermined type matching the type enumeration, the predetermined type selected from a set of predetermined types, the set including at least each of aRegisterDevice type, defined as:
```
<xs:simpleType name="DeviceType" >
    <xs:restriction base="xs:string">
        <xs:enumeration value="Prepaid" />
        <xs:enumeration value="Subscription" />
    </xs:restriction>
</xs:simpleType>
```
a CreatePrepaidPacket type, defined as:
```
<xs:complexType name="CreatePrepaidPacket">
    <xs:sequence>
        <xs:element name="PUID" type="xs:string" />
        <xs:element name="TrackingGuid" tvpe="xs:string" />
        <xs:element name="Points" tvpe ="xs:int" />
        <xs:element name="HWJD" type="xs:string" />
        <xs:element name="UPID" type="xs:string" />
        <xs:element name="Minutes" type="xs:int" />
    </xs:sequence>
</xs:complexType>
```
a CertRequest type, defined as:
```
<xs:complexType name="CertReguest">
    <xs:sequence>
        <xs:element name="InitKey" type="xs:string" />
        <xs:element name="HWJD" type="xs:string" />
        <xs:element name="Reguest" type="xs:string" />
        <xs:element name="UPID" type="xs:string" />
    </xs:sequence>
</xs:complexType>
```

-continued a PacketDownload type, defined as:
```
<xs:complexType name="PacketDownload">
    <xs:sequence>
        <xs:element name="JobIds" maxOccurs="unbounded">
            <xs:complexType>
                <xs:sequence>
                    <xs:element name="JobId" type="xs:long" />
                    <xs:element name="DownloadCount" type="xs:int" />
                    <xs:element name="DownloadOverLimit" type="xs:boolean"/>
                </xs:sequence>
            </xs:complexType>
        </xs:element>
    </xs:sequence>
</xs:complexType>
```
a PacketDownloadAek Type, defined as:
```
<xs:complexType name="PacketDownloadAck">
    <xs:sequence>
        <xs:element name="JobIds" maxOccurs=" unbounded">
            <xs:complexType>
                <xs:sequence>
                    <xs:element name="JobId" type="xs:long" />
                </xs:sequence>
            </xs:complexType>
        </xs:element>
    </xs:sequence>
</xs:complexType>
```
a SubscribeDevice Type, defined as:
```
<xs:complexType name="SubscribeDeviee">
    <xs:sequence>
        <xs:element name="DeviceName" type="xs:string" />
        <xs:element name="BeginDate" tvpe="xs:date" />
        <xs gelement name="EndDate" type="xs:date" minOccurs="0" />
        <xs:element name="Mode" type="SubscriptionMode" />
    </xs:sequence>
</xs:complexType>
```
aConfigureDevice type, defined as:
```
<xs:complexType name="ConfigureDevice">
    <xs:sequence>
        <xs:element name="DeviceName" type="xs:string" />
        <xs:element name="GracePeriodInMinutes" type="xs:int" minOccurs="0" />
        <xs:element name="EnforcementLevel" tvpe="EnforcementLevelType" minOccurs="0" />
    </xs:sequence>
</xs:complexType>
```
a ConfigureDefault type, defined as:
```
<xs:complexType name="ConfigureDefault">
    <xs:sequence>
        <xs:element name="MaxCertDownloadCount" type="xs:int" minOccurs="0" />
        <xs:element name="MaxPacketDownloadCount" type="xs:int" minOccurs="0" />
        <xs:element name="EnforcementLevel" type="EnforcementLevelType" minOccurs="0" />
        <xs:element name="GracePeriodInMinutes" type="xs:int" minOccurs="0" />
        <xs:element name="PreProcessPeriodInDays" type="xs:int" minOccurs="0" />
        <xs:element name="EnforcementPeriod" type="xs:int" minOccurs="0" />
        <xs:element name="EnforcementPeriodTimeUnit" type="TimeUnitType" minOccurs="0" />
    </xs:sequence>
</xs:complexType>
```
a CreateSubscriptionPacket type, defined as:
```
<xs:complexType name="CreateSubscriptionPacket">
    <xs:sequence>
        <xs:element name="DeviceName" type="xs:string" />
        <xs:element name="PacketEndDate" type="xs:date" />
        <xs:element name="Perpetual" type="xs:boolean" />
    </xs:sequence>
</xs:complexType>
```

-continued a BatchIn type, defined as:
```
<xs:complexType name="BatchIn">
    <xs:sequence>
        <xs:element name="BatchId" type="xs:string" />
        <xs:element name="PartnerId" type="xs:string" />
        <xs:element name="CallbackUrl" type="xs:string" />
        <xs:element name="Item" maxOccurs="unbounded">
            <xs:complexType>
                <xs:sequence>
                    <xs:choice>
                        <xs:element name="RegisterDevice" type="RegisterDevice" />
                        <xs:element name="SubscribeDevice" type="SubscribeDevice" />
                        <xs:element name="ConfigureDevice" type="ConfigureDevice" />
                        <xs:element name="ConfigureDefault" type="ConfigureDefault" />
                        <xs:element name="CreateSubscriptionPacket" type="CreateSubscriptionPacket" />
                    </xs:choice>
                    <xs:element name="Type" type="RequestType" />
                </xs:sequence>
            </xs:complexType>
        </xs:element>
    </xs:sequence>
</xs:complexType>
```
a ScheduleSubscriptionPacket type, defined as:
```
<xs:complexType name="ScheduleSubscriptionPacket">
    <xs:sequence>
        <xs:element name="SchedulerJobId" type="xs:long" />
        <xs:element name="NextDate" type="xs:date" />
        <xs:element name="PacketEndDate" type="xs:date" />
    </xs:sequence>
</xs:complexType>
```
a QueryBatchOut type, defined as
```
<xs:complexType name="QueryBatchOut">
    <xs:sequence>
        <xs:element name="PartnerId" type="xs:string" />
        <xs:element name="BatchId" type="xs:string" />
        <xs:element name="CallbackUrl" type="xs:string" />
    </xs:sequence>
</xs:complexType>
```
and
a StartPendingJob type, defined as:
```
<xs:complexType name="StartPendingJob">
    <xs:sequence>
        <xs:element name="JobId" type="xs:long" />
        <xs:element name="JobType" type="xs:int" />
        <xs:element name="Data" type="xs:string" />
```

-continued
```
        </xs:sequence>
    </xs:complexType>
``` and
removing the message from the first queue when one of the verifying the protocol message schema fails and the verifying the content object fails.

2. The computer-readable storage medium of claim 1, wherein receiving a message at a first queue comprises receiving a message at a first queue from a first service.

3. The computer-readable storage medium of claim 2, wherein the first service is a customer service tool service and the predetermined type is one of a ResetLSN type and a RecreatePacket type.

4. The computer-readable storage medium of claim 2, wherein the first service is a resource monitor service and the predetermined type is a ServiceHealth type.

5. The computer-readable storage medium of claim 2, wherein the first service is an operations tool service and the predetermined type is a TestConnection type.

6. The computer-readable storage medium of claim 1, wherein the first queue is a database writer queue service input queue and the predetermined type is one of a Packet-Publish type and a BootstrapPublish type.

7. The computer-readable storage medium of claim 1, wherein the first queue is a certificate web service queue and the predetermined type is a CertResponse type.

8. The computer-readable storage medium of claim 1, wherein the first queue is a subscription service queue and the predetermined type is a BatchOut type.

9. A method of processing a message supporting prepaid and subscription transactions comprising:
receiving the message at a service input queue, the message having a plurality of attributes and at least one content object;
verifying a version attribute;
verifying a requester attribute;
verifying a type attribute matches one of a set of predetermined types corresponding to the service input queue, the set including at least each of

--- a RegisterDevice type, defined as:
```
<xs:simpleType name="DeviceType" >
    <xs:restriction base="xs:string">
        <xs:enumeration value="Prepaid" />
        <xs:enumeration value="Subscription" />
    </xs:restriction>
</xs:simpleType>
```
a CreatePrepaidPacket type, defined as:
```
<xs:complexType name="CreatePrepaidpacket">
    <xs:sequence>
        <xs:element name="PUID" type="xs:string" />
        <xs:element name="TrackingGuid" type="xs:string" />
        <xs:element name="Points" type="xs:int" />
        <xs:element name="HWID" type="xs:string" />
        <xs:element name="UPID" type="xs:string" />
        <xs:element name="Minutes" type="xs:int" />
    </xs:sequence>
</xs:complexType>
```

-continued a CertRequest type, defined as:
```
<xs:complexType name="CertRequest">
  <xs:sequence>
    <xs:element name="InitKey" type="xs:string" />
    <xs:element name="HWID" type="xs:string" />
    <xs:element name="Request" type="xs:string" />
    <xs:element name="UPID" type="xs:string" />
  </xs:sequence>
</xs:complexType>
```
a PacketDownload type, defined as:
```
<xs:complexType name="PacketDownload">
  <xs:sequence>
    <xs:element name="JobIds" maxOccurs="unbounded">
      <xs:complexType>
        <xs:sequence>
          <xs:element name="JobId" type="xs:long" />
          <xs:element name="DownloadCount" type="xs:int" />
          <xs:element name="DownloadOverLimit" type="xs:boolean"/>
        </xs:sequence>
      </xs:complexType>
    </xs:element>
  </xs:sequence>
</xs:complexType>
```
a PacketDownloadAck Type, defined as:
```
<xs:complexType name="PacketDownloadAck">
  <xs:sequence>
    <xs:element name="JobIds" maxOccurs="unbounded">
      <xs:complexType>
        <xs:sequence>
          <xs:element name="JobId" type="xs:long" />
        </xs:sequence>
      </xs:complexType>
    </xs:element>
  </xs:sequence>
</xs:complexType>
```
a SubscribeDevice Type, defined as:
```
<xs:complexType name="SubscribeDevice">
  <xs:sequence>
    <xs:element name="DeviceName" type="xs:string" />
    <xs:element name="BeginDate" type="xs:date" />
    <xs:element name="EndDate" type="xs:date" minOccurs="0" />
    <xs:element name="Mode" type="SubscriptionMode" />
  </xs:sequence>
</xs:complexType>
```
a ConfigureDevice type, defined as:
```
<xs:complexType name="ConfigureDevice">
  <xs:sequence>
    <xs:element name"DeviceName" type="xs:string" />
    <xs:element name="GracePeriodInMinutes" type="xs:int" minOccurs="0" />
    <xs:element name="EnforcementLevel" type="EnforcementLevelType" minOccurs="0" />
  <xs:sequence>
</xs:complexType>
```
a ConfigureDefault type, defined as:
```
<xs:complexType name="ConfigureDefault">
  <xs:sequence>
    <xs:element name="MaxCertDownloadCount" type="xs:int" minOccurs="0" />
    <xs:element name="MaxPacketDownloadCount" type="xs:int" minOccurs="0" />
    <xs:element name="EnforcementLevel" type="EnforcementLevelType" minOccurs="0" />
    <xs:element name="GracePeriodInMinutes" type="xs:int" minOccurs="0" />
    <xs:element name="PreProcessPeriodInDays" type="xs:int" minOccurs="0" />
    <xs:element name="EnforcementPeriod" type="xs:int" minOccurs="0" />
    <xs:element name="EnforcementPeriodTimeUnit" type="TimeUnitType" minOccurs="0" />
  </xs:sequence>
</xs:complexType>
```

-continued

```
a CreateSubscriptionPacket type, defined as:
    <xs:complexType name="CreateSubscriptionPacket">
        <xs:sequence>
            <xs:element name="DeviceName" type="xs:string" />
            <xs:element name="PacketEndDate" type="xs:date" />
            <xs:element name="Perpetual" type="xs:boolean" />
        </xs sequence>
    </xs:complexType>
a BatchIn type, defined as:
    <xs:complexType name="BatchIn">
        <xs:sequence>
            <xs:element name="BatchId" type="xs:string" />
            <xs:element name="PartnerId" type="xs:string" />
            <xs:element name="CallbackUrl" type="xs:string" />
            <xs:element name="Item" maxOccurs="unbounded">
                <xs:complexType>
                    <xs:sequence>
                        <xs:choice>
                            <xs:element name="RegisterDevice" type="RegisterDevice" />
                            <xs:element name="SubscribeDevice" type="SubscribeDevice" />
                            <xs:element name="ConfigureDevice" type="ConfigureDevice" />
                            <xs:element name="ConfigureDefault" type="ConfigureDefault" />
                            <xs:element name="CreateSubscriptionPacket" type="CreateSubscriptionPacket" />
                        </xs:choice>
                        <xs:element name="Type" type="RequestType" />
                    </xs:sequence>
                </xs:complexType>
            </xs:element>
        </xs:sequence>
    </xs:complexType>
a ScheduleSubscriptionPacket type, defined as:
    <xs:complexType name="ScheduleSubscriptionPacket">
        <xs:sequence>
            <xs:element name="SchedulerJobId" type="xs:long" />
            <xs:element name="NextDate" type="xs:date" />
            <xs:element name="PacketEndDate" type="xs:date" />
        </xs:sequence>
    </xs:complexType>
a QueryBatchOut type, defined as
    <xs:complexType name="QueryBatchOut">
        <xs:sequence>
            <xs:element name="PartnerId" type="xs:string" />
            <xs:element name="BatchId" type="xs:string" />
            <xs:element name="CallbackUrl" type="xs:string" />
        </xs:sequence>
    </xs:complexType>
and
a StartPendingJob type,defined as:
    <xs:complexType name="StartPendingJob">
        <xs:sequence>
            <xs:element name="JobId" type="xs:long" />
            <xs:element name="JobType" type="xs:int" />
            <xs:element name="Data" type="xs:string" />
        </xs:sequence
    </xs:complexType>;
``` and analyzing a content object to determine that the content object type matches the type attribute.

10. The method of claim 9, wherein receiving the message at a service input queue comprises receiving the message at a database writer service input queue, and verifying a type attribute matches one of a set of predetermined types comprises verifying a type attribute matches one of a set of predetermined types including a PacketPublish type and a BootstrapPublish type.

11. The method of claim 9, wherein verifying a type attribute matches one of a set of predetermined types corresponding to the service input queue comprises verifying the type attribute is one of a ResetLSN type and a RecreatePacket type.

12. The method of claim 9, wherein verifying a type attribute matches one of a set of predetermined types corresponding to the service input queue comprises verifying the type attribute is a ServiceHealth type.

13. The method of claim 9, wherein verifying a type attribute matches one of a set of predetermined types corresponding to the service input queue comprises verifying the type attribute is a TestConnection type.

* * * * *